May 12, 1964 R. D. GOODENOUGH ETAL 3,132,922
LITHIUM FLUORIDE PRODUCTION
Filed April 1, 1963
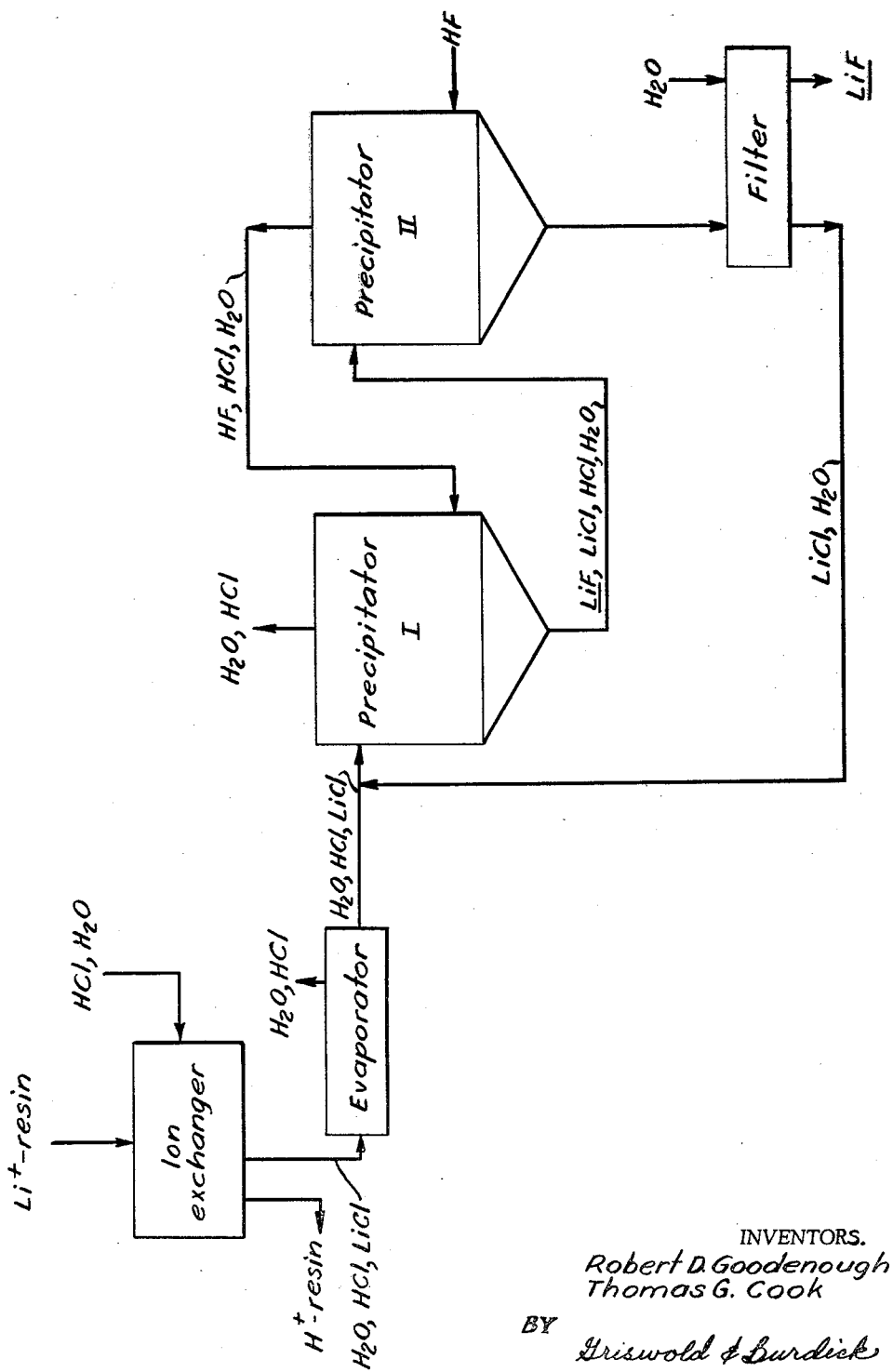
INVENTORS.
Robert D. Goodenough
Thomas G. Cook
BY
Griswold & Burdick
ATTORNEYS

United States Patent Office 3,132,922
Patented May 12, 1964

3,132,922
LITHIUM FLUORIDE PRODUCTION
Robert D. Goodenough, Midland, and Thomas G. Cook, Bay City, Mich., assignors to The Dow Chemical Company, Midland, Mich., a corporation of Delaware
Filed Apr. 1, 1963, Ser. No. 269,382
4 Claims. (Cl. 23—88)

This invention relates to an improved method for the production of lithium fluoride. More particularly, the present invention relates to an improved method of producing lithium fluoride from an aqueous lithium chloride solution such as that which results when lithium value is eluted from a strongly acidic cation exchange resin with aqueous hydrochloric acid solution.

A method of extracting lithium from lithium-bearing ores has been suggested in U.S. Patent 2,980,499. In the method therein proposed, lithium is recovered from its acid soluble ores by mixing a quantity of ore with liquid water and a strongly acidic cationic exchange resin. After separating the resin from the gangue, the resin may be eluted with an aqueous acid such as aqueous hydrochloric acid thereby forming an aqueous solution of lithium chloride. Under usual operating conditions and practice, excess amounts of aqueous acid are used to elute lithium ion from the resin which holds it. If this acid is not recovered, a substantial economic loss may be sustained. Further, depending on the particular acid and source of fluoride ion, materials may be produced which are of little or no commercial value, and which may also tend to interfere with the recovery of lithium fluoride.

It is therefore an object of this invention to provide a method wherein substantially pure lithium fluoride may be produced.

It is another object of the present invention to provide a process wherein substantial amounts of the acid used to elute the lithium value from the ion exchange resin are both regenerated and recovered.

It is still another object of the present invention to provide a process wherein substantially all fluoride ion introduced to the process is used to produce lithium fluoride.

Other objects and advantages of the present invention will become apparent in the course of the following specification taken in light of the accompanying drawing which illustrates a flow diagram of the present process.

The objects and advantages of the present invention may be attained by first introducing an aqueous lithium chloride-hydrochloric acid solution to an evaporator. A substantial amount of the water and hydrochloric acid are then evaporated from the lithium chloride-containing solution. The relatively concentrated aqueous lithium chloride solution which may also contain some hydrochloric acid, is then introduced to a first precipitator. To the first precipitator is also introduced free hydrogen fluoride or an aqueous solution of hydrofluoric acid obtained by evaporation from another precipitation stage. Hydrochloric acid may also be present with the aqueous hydrofluoric acid. In the precipitator lithium fluoride is produced and withdrawn as a precipitate. Water and hydrochloric acid are also removed as by evaporation from the precipitator at this stage.

A substantial portion of aqueous lithium chloride solution and some hydrochloric acid will usually accompany the lithium fluoride precipitate removed from the precipitator. The lithium fluoride precipitate, containing aqueous lithium chloride solution, is then introduced to a second precipitator.

Free hydrogen fluoride, or aqueous hydrofluoric acid, if desired, is also introduced to the second precipitator. A stream containing hydrofluoric acid, hydrochloric acid and water is removed from said second precipitator as by evaporation and introduced to the first precipitator as hereinbefore noted. In the second precipitator, a substantial degree of precipitation of lithium fluoride takes place. A stream containing lithium chloride, water, and lithium fluoride precipitate is removed from the second precipitator and introduced to a filter. Water is used to wash the precipitate in the filter. The aqueous lithium chloride-containing filtrate may then be recycled and added to the stream containing water, hydrochloric acid, and lithium chloride which enters the first precipitator from the evaporator. Substantially pure lithium fluoride is obtained from the filter as a product of the present process. The water and hydrochloric acid evaporated from the first precipitator and the evaporator may also be recovered and recycled in the present process or used as a source of aqueous hydrochloric acid in other processes.

As may be seen from the appended drawing, this process is particularly adapted for continuous operation. When used continuously and in conjunction with the lithium extraction process disclosed in U.S. Patent 2,980,-499, the aqueous hydrochloric acid recovered by evaporation in the present process may be directly recycled to the elution step, thereby resulting in substantial economic advantages due to the savings in acid costs.

The evaporating step in the present process has at least two purposes. First, the total volume of the aqueous stream to be admitted to the precipitator is substantially reduced, thereby increasing the lithium chloride concentration. Second, substantial portions of aqueous hydrochloric acid are recoverable from the vapor, thus providing a ready source of aqueous hydrochloric acid solution.

In the first precipitator a relatively small amount of aqueous hydrofluoric acid is contacted with a relatively large amount of lithium chloride solution. Because of this substantial excess of lithium ion in relation to the amount of fluoride ion available for reaction therewith, substantially all the available fluoride ion introduced to the first precipitator is used up in the production of said lithium fluoride precipitate. An amount of hydrochloric acid corresponding to the amount of lithium ion used up in the first precipitator is also produced. Further, substantial amounts of hydrochloric acid produced in or carried to the second precipitator are removed therefrom and introduced to the first precipitator with the aqueous hydrofluoric acid. Substantially all of this aqueous hydrochloric acid is removed as by evaporation from the first precipitator and thereby from the system.

The lithium chloride solution introduced to the second precipitator along with the lithium fluoride removed from the first precipitator is again substantially in excess of the amount required to fully react with the fluoride ion introduced to said second precipitator. Ordinarily, an amount of about 75 percent or more of the available fluoride ion is reacted in the second precipitator to form lithium fluoride precipitate. Again, an amount of hydrochloric acid corresponding to the amount of lithium chloride used to produce lithium fluoride is obtained. The aqueous hydrochloric acid is substantially completely removed with unreacted hydrofluoric acid as by evaporation from the second precipitator. This solution is then introduced, as hereinbefore noted, to the first precipitator where the balance of the hydrofluoric acid is reacted with lithium chloride to form lithium fluoride.

It is essential that lithium chloride is utilized as the source of lithium ion and that hydrofluoric acid or free hydrogen fluoride are utilized as the source of fluoride ions in the process of the present invention. When other sources of lithium and fluoride ions are employed, products may be obtained which would interfere with the recovery of lithium fluoride precipitate, interfere with the recovery of acid from the process, or results in soluble products building up and eventually reaching undesirable concentrations within the system.

For example; if lithium sulfate is employed as a source of lithium ion and hydrofluoric acid is employed as a source of fluoride ion, reaction to form lithium fluoride would leave sulfuric acid in solution. Recovery of the sulfuric acid by evaporation would result in substantial losses of hydrofluoric acid since the boiling point of the sulfuric acid is substantially higher than that of the hydrofluoric acid. Further, sulfuric acid may tend to solubilize the lithium fluoride precipitate with a resultant loss in production efficiency.

If lithium sulfate is employed as a source of lithium ion and sodium fluoride is employed as a source of fluoride ion, reaction to form lithium fluoride would leave a solution containing sodium sulfate. After a period of time, the system would tend to build up a high concentration of sodium sulfate, requiring a shut down of the entire process and drainage of the equipment.

When the process of the present invention is carried out as herein specified a substantially pure lithium fluoride product is obtained. Furthermore, substantially all hydrochloric acid introduced to the system either in the elution step or later is recovered with a minimal loss of hydrofluoric acid thereby.

Ordinarily, temperatures of from about 99 to about 145 degrees centigrade are appropriate for use in the evaporation step. Similarly, in the precipitator stages temperatures may run as high as 145 degrees centigrade. What is critical, is that substantially all of the hydrochloric acid be evaporated or otherwise removed from the second precipitator stage. If such removal is not accomplished, a buildup of hydrochloric acid is likely to occur due to the recycling of the filtrate stream from the filter into the lithium chloride input stream to the first precipitator. Ideally, as much hydrochloric acid is removed from the system as is possible in the evaporator step without substantially hindering the flow characteristics of the aqueous lithium chloride containing solution.

When reaction of the fluoride ion in the first precipitator is not complete, some fluoride ion may be lost as hydrofluoric acid through evaporation with the aqueous hydrochloric acid.

It is for this reason, that an amount of lithium chloride is introduced into the system which is substantially in excess of the stoichiometric amount required to react with the hydrofluoric acid. This loss may also be substantially lessened by providing another precipitator step, if desired.

With reference to the drawing, it may be seen that once the process is in continuous operation, the amount of lithium chloride introduced to the evaporator may be the stoichiometric amount required to react with the hydrofluoric acid introduced to the system. The recycled lithium chloride, then, will take care of the requisite excess in order to obtain full use of the hydrofluoric acid.

A better understanding of the present invention may be obtained in light of the following example which is set forth to illustrate, and is not to be construed to limit, the present invention.

*Example*

A lithium-containing beta-spodumene ore was treated by means of a strongly acidic cation exchange resin by substantially the same method disclosed in U.S. Patent 2,980,499. The resin was eluted with 20 percent aqueous hydrochloric acid in an amount sufficient to give a stream containing 695 pounds lithium chloride, 571 pounds of hydrochloric acid, and 20,000 pounds of water. This stream was introduced to an evaporator and 18,406 pounds of water and 544 pounds of hydrochloric acid were removed thereby. The remaining liquid stream from the evaporator contained about 695 pounds lithium chloride, 28 pounds of hydrochloric acid, and 1,594 pounds of water. To this stream was added the recycle stream from the filter, which contained about 400 pounds of lithium chloride dissolved in 497 pounds of water. The combined stream was then introduced to the first precipitator, where 626 pounds of hydrochloric acid, 2.4 pounds of hydrofluoric acid, and 1,921 pounds of water were driven off by evaporation. An aqueous stream containing 2,293 pounds of water, 1000 pounds of lithium chloride, 41 pounds of hydrochloric acid and 58 pounds of lithium fluoride precipitate was removed from the first precipitator and introduced to second precipitator.

To the second precipitator were also introduced 331 pounds of free hydrogen fluoride. Twenty-one hundred and twenty-three pounds of water, 557 pounds of hydrochloric acid, and 47 pounds of hydrofluoric acid were removed from the second precipitator and introduced to the first precipitator.

An aqueous stream containing lithium fluoride precipitate, water, and lithium chloride was removed from the second precipitator and introduced to a filter. Three hundred and thirty-seven pounds of water were used to wash the filter cake in the filter. A filter cake containing 425 pounds of lithium fluoride and fifty pounds of water was obtained from the filter, the filtrate containing about 400 pounds of lithium chloride and 497 pounds of water. Upon analysis of the filter cake, only trace amounts of acidity or chloride content were found, and surprisingly, no lithium bifluoride formation was observed.

The loss of hydrofluoric acid from the first precipitator represented only 0.73 percent of the hydrofluoric acid fed to the process. This amount may be substantially reduced by the addition of another precipitation stage if desired.

Various modifications may be made in the present invention without departing from the spirit or scope thereof, and it is to be understood that we limit ourselves only as defined in the appended claims.

We claim:

1. A method of producing lithium fluoride which comprises, (1) loading a strongly acidic cation exchange resin with lithium ions from a lithium-containing ore, (2) eluting said lithium ions from said resin with aqueous hydrochloric acid, thereby providing an aqueous solution of lithium chloride and hydrochloric acid, (3) evaporating a substantial amount of aqueous hydrochloric acid from said solution and recycling said aqueous hydrochloric acid to step (2), (4) contacting the aqueous lithium chloride containing solution with an aqueous solution of hydrogen fluoride thereby to precipitate lithium fluoride, (5) evaporating aqueous hydrochloric acid from the aqueous lithium fluoride-lithium chloride mixture thus obtained and recycling said aqueous hydrochloric acid to step (2), (6) contacting said aqueous lithium fluoride-lithium chloride mixture with hydrogen fluoride thereby to precipitate additional lithium fluoride, (7) evaporating and recycling water, hydrochloric acid, and hydrogen fluoride from the aqueous lithium chloride-lithium fluoride mixture to provide the hydrogen fluoride-containing solution of step (4), (8) removing precipitated lithium fluoride from the aqueous lithium chloride by filter means, (9) recycling the aqueous lithium chloride solution from the filter to the aqueous lithium chloride-containing solution obtained in step (3), and (10) recovering solid lithium fluoride from said filter means.

2. A method of producing lithium fluoride which comprises, (1) eluting a strongly acidic cation exchange resin with hydrochloric acid, said resin having been previously loaded with lithium ions, thereby providing an aqueous solution of lithium chloride and hydrochloric acid, (2) evaporating a substantial amount of aqueous hydrochloric acid from said solution and recycling said aqueous hydrochloric acid to step (1), (3) contacting the aqueous lithium chloride-containing solution with an aqueous solution of hydrogen fluoride thereby to precipitate lithium fluoride, (4) evaporating water and hydrochloric acid from the aqueous lithium fluoride-lithium chloride mixture thus obtained and recycling said aqueous hydrochloric acid to step (1), (5) contacting said aqueous lithium fluoride-lithium chloride mixture with hydrogen fluoride thereby to precipitate additional lithium fluoride, (6) evaporating and recycling water, hydrochloric acid, and hydrogen fluoride from the aqueous lithium chloride-lithium fluoride mixture to provide the hydrogen fluoride-containing solution of step (3), (7) removing precipitated lithium fluoride from the aqueous lithium chloride by filter means, (8) recycling the aqueous lithium chloride solution from the filter to the aqueous lithium chloride-containing solution obtained in step (2), and (9) recovering solid lithium fluoride from said filter means.

3. A method of producing lithium fluoride which comprises, (1) providing an aqueous solution of lithium chloride and hydrochloric acid, (2) evaporating a substantial amount of aqueous hydrochloric acid from said solution, (3) contacting the aqueous lithium chloride-containing solution with an aqueous solution of hydrogen fluoride thereby to precipitate lithium fluoride, (4) evaporating aqueous hydrochloric acid from the aqueous lithium fluoride-lithium chloride mixture thus obtained, (5) contacting said aqueous lithium fluoride-lithium chloride mixture with hydrogen fluoride thereby to precipitate additional lithium fluoride, (6) evaporating and recycling water, hydrochloric acid, and hydrogen fluoride from the aqueous lithium chloride-lithium fluoride mixture to provide the hydrogen fluoride-containing solution of step (3), (7) removing precipitated lithium fluoride from the aqueous lithium chloride by filter means, (8) recycling the aqueous lithium chloride solution from the filter to the aqueous lithium chloride-containing solution obtained in step (2), and (9) recovering solid lithium fluoride from said filter means.

4. A method of producing lithium fluoride which comprises, (1) providing an aqueous solution of lithium chloride and hydrochloric acid, (2) evaporating a substantial amount of aqueous hydrochloric acid from said solution, (3) contacting the aqueous lithium chloride containing solution with an aqueous solution of hydrogen fluoride thereby to precipitate lithium fluoride, (4) evaporating aqueous hydrochloric acid from the aqueous lithium fluoride-lithium chloride mixture thus obtained, (5) contacting said aqueous lithium fluoride-lithium chloride mixture with an amount of hydrogen fluoride substantially less than the stoichiometric amount required to react with the lithium chloride, thereby to precipitate additional lithium fluoride, (6) evaporating and recycling water, hydrochloric acid, and hydrogen fluoride from the aqueous lithium chloride-lithium fluoride mixture to provide the hydrogen fluoride-containing solution of step (3), (7) removing precipitated lithium fluoride from the aqueous lithium chloride by filter means, (8) recycling the aqueous lithium chloride solution from the filter to the aqueous lithium chloride-containing solution obtained in step (2), and (9) recovering solid lithium fluoride from said filter means.

References Cited in the file of this patent
UNITED STATES PATENTS
2,980,499     Goodenough et al. _____ Apr. 18, 1961